United States Patent [19]

Herb et al.

[11] 4,274,801

[45] Jun. 23, 1981

[54] MACHINE TOOL WITH AN ADJUSTABLE MECHANISM FOR FIXING AND DISPLACING A WORKPIECE RELATIVE TO A TOOL

[75] Inventors: Eugen Herb, Ditzingen; Berthold Leibinger, Gerlingen, both of Fed. Rep. of Germany

[73] Assignee: Trumpf Maschinen AG, Switzerland

[21] Appl. No.: 8,516

[22] Filed: Feb. 1, 1979

[30] Foreign Application Priority Data

Feb. 10, 1978 [DE] Fed. Rep. of Germany ....... 2805532

[51] Int. Cl.$^3$ ............................................. B23D 27/00
[52] U.S. Cl. .................................. 414/751; 414/749; 269/73
[58] Field of Search ........................ 414/749, 751–753, 414/14, 20; 83/209, 237; 269/73

[56] References Cited

U.S. PATENT DOCUMENTS

| | | | |
|---|---|---|---|
| 3,512,438 | 5/1970 | Burdge | 83/209 |
| 3,563,123 | 2/1971 | Leibinger | 83/237 |
| 4,023,788 | 5/1977 | Herb et al. | 269/73 |

*Primary Examiner*—Leslie J. Paperner
*Assistant Examiner*—Terrance L. Siemens
*Attorney, Agent, or Firm*—McGlew and Tuttle

[57] ABSTRACT

A machine tool construction, comprises, a support frame which has a bar portion extending in one direction, for example, a longitudinal direction, with a gear rack defined thereon, and with a carrier guide movable along said bar portion and having a drive motor for its movement with a pinion which is engaged on the rack to effect the motion. A work carrier is similarly mounted in the carrier guide for movement at right angles to the axis of the bar and it is driven by a separate drive motor driving through a pinion and a rack defined on the work carrier. At least one work holder is mounted for slidable movement along the work carrier and it may be locked to the work carrier against movement and transported by movement of the work carrier or it may be released from the work carrier. In addition, a locking device is provided for locking the work carrier in a fixed position and it may be carried either by the frame of the machine itself or by the carrier guide. The locking device includes a locking member which may be forced downwardly into a locking recess defined on each work holder, only when the work holder is located directly below the locking element. When the work holder is locked by the locking device, it may be released from the carrier, and the carrier may be moved to similarly transport another work holder into association with another locking device. Each work carrier includes clamping a clamp for clamping a workpiece.

12 Claims, 6 Drawing Figures

MACHINE TOOL WITH AN ADJUSTABLE MECHANISM FOR FIXING AND DISPLACING A WORKPIECE RELATIVE TO A TOOL

FIELD AND BACKGROUND OF THE INVENTION

This invention relates to machine tool construction in general and, in particular, to a new and useful machine tool having a work carrier which is mounted for movement in a carrier guide which, in turn, is supported for movement at right angles to the work carrier and the machine frame and, wherein, a work holder is also movable along the work carrier and may be fixed to the carrier for movement therewith and wherein each work holder may be locked by a locking device oriented over the carrier and engageable into a locking recess of the work holder when the work holder is precisely positioned in respect to a locking element of the locking device.

DESCRIPTION OF THE PRIOR ART

As a general rule, the workpieces to be worked in a machine tool are of unequal sizes. In order to be able to clamp each workpiece in the most suitable manner, the spacing between the work holders must be made variable. If all work holders are displaceable, the workpiece can be clamped in a manner which is optimal for the machining thereof. It is also usual to provide that the work holder or holders are displaceable along the same guide in the longitudinal direction of the work carrier as far as possible.

If for whatever reasons it is not possible to leave it to the operator of the machine tool to determine the exact position of the work holders on the work carrier, he is given a so-called setting program. Such a program determines the exact positions of the work holders on the work carrier during the machining of a specific workpiece. For example, starting from a mid-position of two work holders, one holder is to be displaced to the left and the other to the right. The accurate positions are found, for example, by measuring their distance from the associated end of the work carrier. Aside from the fact that such a kind of setting is relatively time-consuming, particular accuracy of adjustment cannot be obtained in addition. Such an accurate adjustment may, however, be required if the workpiece is to be machined up to close to the work holder or holders.

It occasionally happens, particularly with the punching or nibbling of large plates, or with other kinds of machining or workpieces as well, that it is necessary to have the work holders, during a first phase of working, in a first position and to place at least one of them into a new position prior to starting a following phase, because the next operation could not be performed with the work holder in its initial position. Such a displacement is particularly difficult and time consuming and requires highly skilled operators, since the position of the workpiece relative to the tool must not be changed.

Accordingly, there is provided a machine tool which comprises a support frame which has a bar portion with a gear rack defined therealong and a carrier guide which is mounted on the bar for movement backwardly and forwardly therealong by engagement of a pinion of a drive motor carried on the carrier with the rack. The work carrier may be shifted relative to the carrier guide in a similar manner. In addition, a work holder is mounted for movement along the work carrier and may be locked in position relative thereto. The work carrier carries a recess which may be positioned precisely below a locking element of a locking device overlying the work carrier. The locking element may be moved into the recess to hold the work holder in a precise position and when the holder is released from the carrier, the carrier may be shifted so as to engage or move a similar work carrier and position it relative to the first work carrier.

Any work holder can be fixed in place relative to the frame or column, etc., of the machine tool by means of the locking devices. This is a necessry prerequisite for the following positioning of the work holder relative to the locking device. As soon as the work holder is engaged by its locking device, it is disengaged from the work carrier. The work carrier is then displaced relative to the work holder engaged by the locking device until both have reached the relative position desired for the following fixing of the workpiece. Thereafter, this work holder is again secured to the work carrier, for example, by means of a clamping device. If the locking device is now disengaged, the work carrier and this set work holder can be moved together again.

The adjustment of a second an further workholder takes place in the same way, i.e., first the work carrier is displaced until it is possible to engage the second or further work holder with the respective locking device. The locked work holder is then disengaged from the work carrier and the carrier is displaced to the predetermined position relative to the holder, etc.,

SUMMARY OF THE INVENTION

The present invention is directed to a machine tool of the kind which is equipped with an adjustable mechanism for fixing and displacing a workpiece relative to a tool which makes it possible to adjust the position of the work holder or holders relative to the work carrier, even repeatedly, with greater speed and accuracy.

Due to the use of the locking device or devices, an accurate reference point is obtained, permitting the exact displacement of the work carrier relative to each work holder. In contradistinction to the prior art, the invention no longer provides a displacement of the work holders on the work carrier, the carrier is instead displaced as mentioned relative to the work holder which is locked at a quite definite place, namely, at its reference point.

The accuracy of setting is obtained in a simple manner due to the fact that the motion displacing the work carrier relative to the frame, etc., of the machine and, thereby, of course, also relative to the working tool, can be executed in a very precise manner. This setting accuracy is particularly advantageous in that it makes a machining close up to the work holder possible. It will be easily understood that then even the displacement of the work holder after a partial machining of the workpiece will raise absolutely no problems as to the required time and the accuracy obtained.

In a particularly preferred embodiment of the invention, each work holder is provided with a separately powered, in particular, hydraulically actuable fixing device, for securing the holder to the work carrier. This fixing device permits a particularly quick securing of the respective work holder to the work carrier, and vice versa. Of course, it also permits a quick disengagement of the holder as well. In addition, the fixing device offers the possibility of an automatic control of the engagement and disengagement operation by some motion of the machine tool and/or through a special control of the latter. The same analogously applies to another feature of the invention according to which each locking device is actuable by means of a secondary power, particularly, hydraulically.

It is to be noted in this connection, as well as in connection with the fixing device for the work holder, that the hydraulic actuation has the advantage of a strong clamping force and quickest actuation. A pneumatic or electromagnetic actuation has the same advantages. Ordinarily, electric current is always available at a machine tool, and usually also, pressure oil or compressed air. Equipment for hydraulic or pneumatic actuation is particularly simple and rugged and is therefore preferred. Of course, a mechanical actuation may also be considered, for example, through springs or by means of a motor. The costs in this case, however, may exceed those of the preferred hydraulic actuation.

In a development of the invention, each locking device comprises an engaging element cooperating with a receiving element on the work holder.

An inverse arrangement is also possible, i.e., the provision of a movable engaging element on the work holder and a receiving element on the locking device or devices. Incidentally, other means for fixing the work holder to the locking device are also conceivable, for example, a tongs provided on the locking device for firmly engaging a plate on the work holder.

The engaging element is advantageously actuable, in particular, by means of a hydraulic working piston. It is particularly advisable to make the engaging element integral with the working piston, since this results in a simple and rugged construction.

In another embodiment of the invention, the work carrier comprises a T-section guide rail for the work holder or holders and the holder is designed with a T-section slot for receiving the guide rail, and a clamping piston of the hydraulic fixing device can be applied against the head portion of the guide rail. The web of the T-section extending toward the guiding portion, particularly guide rollers, of the rail is received in the narrow portion of the T-section slot with a very small play, permitting only longitudinal displacement, while the head portion of the rail has a relatively large free motion in the direction of the web.

If pressure is now exerted on the side of the rail head portion remote from the web, the head portion is pressed into contact with the respective inside surface of the wider portion of the T-section slot of the work holder. The frictional engagement obtained thereby is sufficient for a secure fixing of the work holder to the work carrier.

The magnitude of the engaging frictional force depends on the dimensions of the engaged surfaces, the size and shape of the clamping piston, and the pressure acting on the clamping piston. Even a plurality of clamping pistons may be provided in a single work holder if needed. In a very advantageous manner, the working pistons of the locking device and the clamping piston of the fixing device are designed as double-acting pistons so that they can be hydraulically moved in both directions.

Another preferred embodiment of the invention provides that the work carrier is supported by a carrier guide and the carrier guide is mounted for longitudinal displacement in a direction perpendicular thereto on a bar of the machine tool, and that both the carrier guide and the work carrier are deivable by means of a motor, in particular, an electric motor. With such a design, the workpiece may be displaced, for example, in any direction within a horizontal plane, the displacement resulting from a longitudinal motion and a transverse motion which are superposed to each other.

Only in such coordinate machine tools is a high accuracy of the displacement of the carrier guide and the work carrier obtained, with the accurate positioning of the latter being of particular importance in the present application. As a rule, this accuracy is combined with a considerable speed of displacement, with the drive being transmitted, for example, by a pinion of the motor meshing with a gear rack of the bar or of the work carrier. The motors for the longitudinal and transverse displacement are mounted on the carrier guide. In a further development of the invention, it is provided that the locking device or devices are supported on the carrier guide.

Another variant of the invention provides that each work holder comprises two holding means for the workpiece which are spaced apart in the longitudinal direction of the holder and, in particular, are designed as clamping shoes. This makes it possible to clamp the workpiece at two spaced locations even in instances where only a single work holder is available or used, and even this provides high security against a rotation of the workpiece.

According to an advantageous further development of the invention, all work holders and locking devices are connected to a control, particularly a program control of the machine tool, whereby, a fully automatic setting and, if provided, displacement of the work holders on the work carrier is ensured without problems. The pulses for the work carrier displacement are also delivered by the control, as later during the machining of the workpiece.

Starting from a definite initial position in which, for example, the work holder or one of the work holdes is arrested by its locking device and the work carrier occupies a predetermined position relative to this locking device, the work carrier can be displaced through the provided distance if, prior to that, the work holder has been brought into a position of disengagement by means of the control. If during the further machining, this work holder which is clamped fast to the work carrier in a new position is to be displaced once again, no problems arise. The relative position of displacement of the work carrier relative to the locking device or devices and, thereby, also of the receiving elements relative to the engaging elements is exactly known in any phase of the machining.

Therefore, by means of the control, the running direction and time of the drive motor, as well as the instant of engaging and disengaging the pistons of the locking and fixing devices, can be set with precision. All of these motions may be easily included in the program for machining a workpiece so that not only the first setting, but also a repeated resetting of the work holder or holders during the machining, does not raise any problems.

With hydraulically actuated pistons, a pulse may be delivered by the control, for example, for switching a valve through which the pressure fluid is fed to the desired side of the piston. The work carrier may be displaced relative to the frame of the machine or the carrier guide by means of an electrical control, for example, by allowing the respective advance motor to run in the necessary direction as long as needed for the displacement.

Accordingly, an object of the present invention is to provide a machine tool construction which comprises a support frame which has a bar portion and with a carrier guide mounted on the bar for movement backwardly and forwardly thereon and a work carrier mounted on the carrier guide for backward and forward movement at right angles to the bar portion and, wherein, at least one workpiece holder, having means for clamping a workpiece is mounted on the work carrier for movement backwardly and forwardly along it and including a locking device overlying the work carrier in the path of movement of the work holder with a locking element which is movable upwardly and downwardly toward and away from the work holder so as to engage into a recess defined on the work holder which may be precisely aligned therewith and thus lock the work holder in position.

A further object of the invention is to provide a machine tool with an adjustable mechanism for fixing and displacing a workpiece relative to a tool which is simple in design, rugged in construction and economical to manufacture.

For an understanding of the principles of the invention, reference is made to the following description of a typical embodiment thereof as illustrated in the accompanying drawings.

DESCRIPTION OF THE PREFERRED EMBODIMENT

Figure 1:
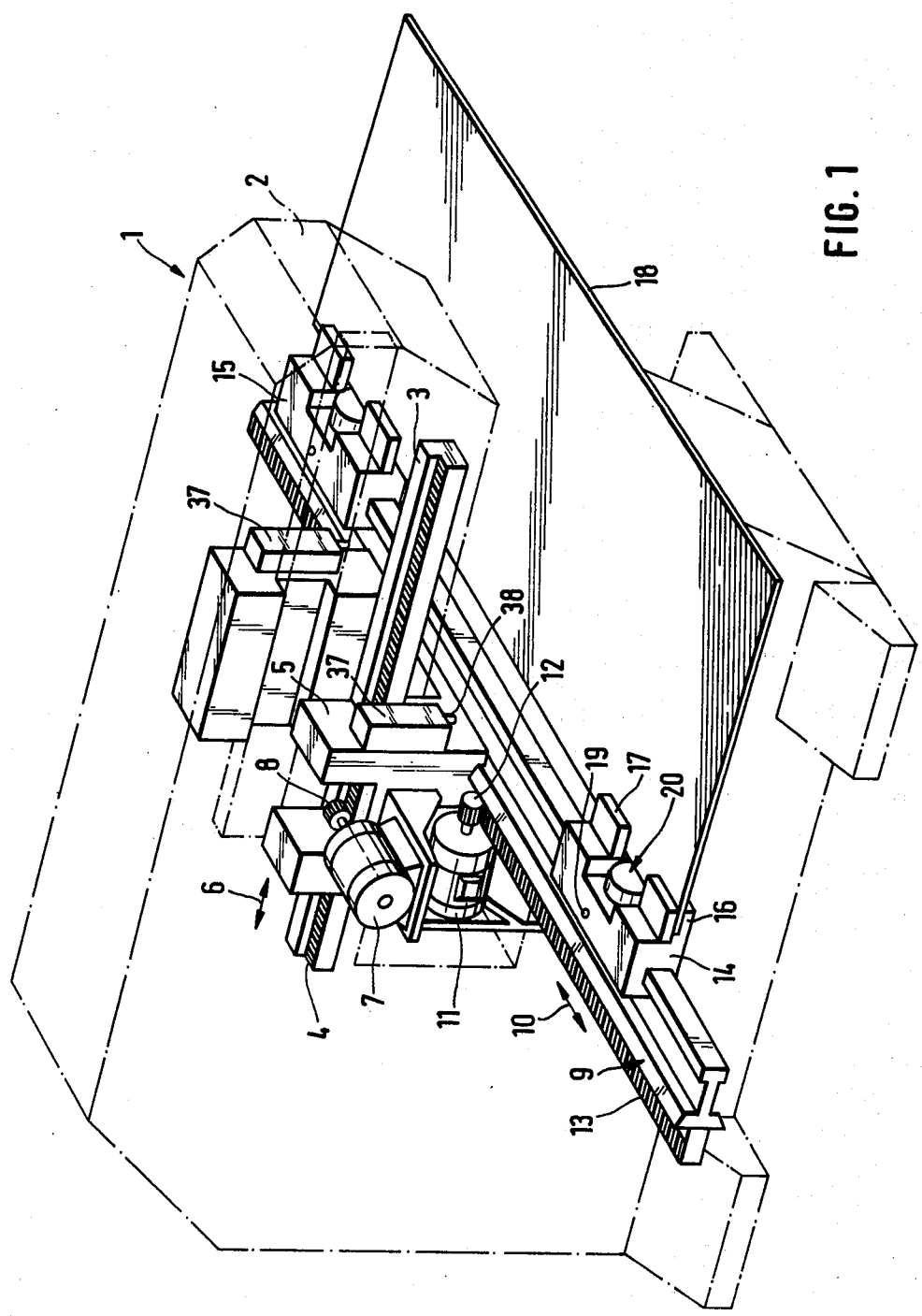
FIG. 1 is a top diagrammatic perspective view of a machine tool constructed in accordance with the present invention.

Referring to the drawings in particular, the invention embodied therein, comprises, a machine tool construction, generally designated 1, which includes a frame 2 having a bar 3 mounted therealong and which extends, for example, in the longitudinal direction. The bar 3 with a gear rack 4 is secured to the side of frame 2 of a machine tool 1, for example, a punching or nibbling machine.

A carrier guide 5 may be displaced in both directions indicated by the double arrow 6 on bar 3. This is done by means of an electric motor 7 mounted on the carrier guide 5 and which carries a pinion 8 on its shaft. The pinion 8 meshes with the teeth of rack 4. Carrier guide 5 supports a work carrier 9 which is mounted thereon for longitudinal displacement in the direction of double-arrow 10 can can be driven by means of a second electric motor 11. The pinion 12 of this second electric motor 11 meshes with the teeth of a second rack 13 which is connected to work carrier 9. The direction of motion of the work carrier 9 is exactly perpendicular to that of carrier guide 5.

Figure 3:
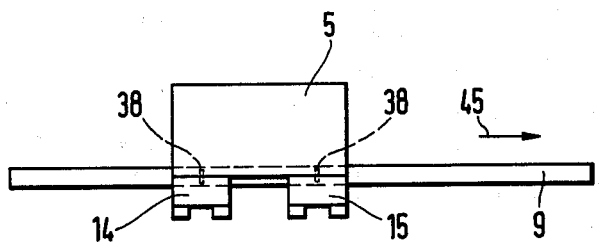
FIGS. 3, 4, 5 and 6 are partial top plan views, schematically indicating the operation of the work carrier and work holder in positioning the work holders relative thereto.
Figure 4:
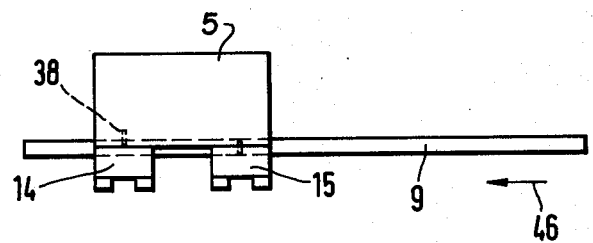

In the embodiment shown in FIG. 3, two work holders 14 and 15 are mounted on work carrier 9 for longitudinal displacement in the directions of double-arrow 10 and may be fixed in any position of displacement. Either or both of the work holders 14 and 15 comprises two fixing devices 16 and 17 which are spaced apart from each other in the longitudinal direction of work carrier 9 and are designed as a kind of clamping shoes. The workpiece 18, which is a plate in the embodiment shown is thereby clamped by either of the work holders at two adjacent, but spaced apart locations, so that even with the use or availability of only a single work holder, the workpiece 18 can be securely held against rotation. In addition, each work holder 14 and 15 is provided with a locking recess 19, for example, a bore, and comprises a fixing device 20. The respective work holder can be clamped fast to the work carrier by means of the fixing device 20 in any position of displacement and disengaged again as needed.

Disregarding rack 13, the work carrier of the embodiment shown has a sectional shape of a trapezoid carrying a T on its shorter side. Carrier 9 can be displaced along guide 5 without play by means of two pairs of rollers 21, 22 and 23, 24, of which the rollers 23 and 24 are associated with oblique sides or surfaces 9a and 9b of the trapezoid, while the first pair of rollers 21, 22 apply against a long side 9c of the trapezoid. A web 25 of the T extends relatively without play through the narrow portion 26 of a T-section slot 27 of work holder 14 or 15, while a head portion 28 of the T of work carrier 9 is engaged in the wider portion of slot 27. In the directions of double arrow 29, the head portion 28 can move within the wide portion 30 of slot 27 with a sufficient play. The free end of a piston 31 of the fixing device 20 or a pressure piece 32 carried on this free piston end also projects into the wide portion 30 of slot 27.

The large diameter portion of piston 31 is axially displaceable within a cylinder 33. If a pressure fluid, for example, pressure oil, is fed into this cylinder through a conduit 34, the piston is moved into its end position, shown in FIG. 2. The free surface of pressure piece 32 is then pressed into firm contact with the head portion 28 of the T of the work carrier 9. Consequently, the underside 35 of the head portion applies against face 26 of the slot and the two surfaces become frictionally locked to each other, whereby, the work holder 14 or 15 is securely fixed to work carrier 9.

In accordance with the invention, two locking devices 37 are secured either to the frame 2 of machine tool 1 directly, or, as in the present example, indirectly to the carrier guide 5, as shown in FIG. 1. The carrier guide 5 is supported on frame 2 by means of the bar 3. A locking element 38 of each locking device 37 can be extended downwardly and cooperates with the locking recess 19 of the associated work holder 14 or 15. Each locking element 38 can be hydraulically moved down and up in the directions of double arrow 39 and it includes an inner, large-diameter portion forming a working piston 40 which is received in a cylinder 41.

Figure 2:
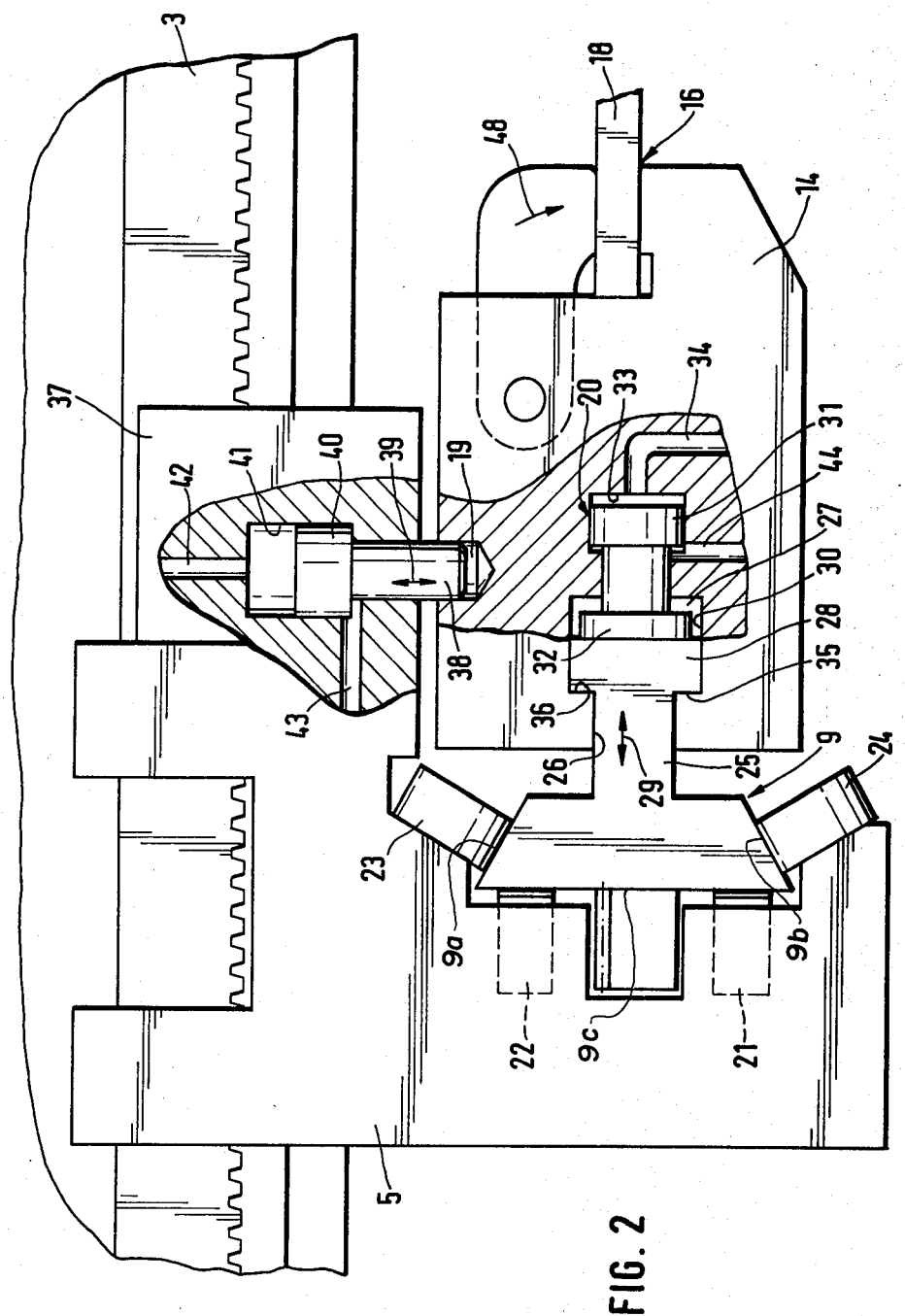
FIG. 2 is an enlarged, partial side elevational view, partly in section, showing the work carrier and work holder construction of the device shown in FIG. 1.

If a pressure fluid, for example, pressure oil, is fed in through a conduit 42, piston 40 and, thereby, also locking element 38, are moved into the lower locking position, shown in FIG. 2 while, upon feeding the pressure fluid through conduit 43 corresponding to conduit 44 of the fixing device 20, piston 40 is displaced upwardly, and locking element 38 is disengaged from recess 19 of work holder 14 or 15. It will be understood that an engagement of locking element 38 and, thereby, an accurate positioning of work holder 14 or 15 in the direction of double arrow 10 relative to frame 2 is only possible if recess 19 comes into a position directly below the free end of locking element 38.

As soon as work holder 14 or 15 becomes locked by the locking device 37 in the manner described and illustrated in FIG. 2, and the fixing device 20 is disengaged, which is done by supplying pressure fluid through conduit 44, work carrier 9 can be displaced relative to the respective locked work holder 14 or 15. This relative displacement is utilized, in accordance with the invention, to bring the work holders into a position on work carrier 9 suitable for the machining of workpiece 18. FIGS. 3 to 6 show the individual steps necessary for this purpose.

Both work holders 14 and 15 are initially held on carrier guide 5 by means of a respective locking device 37 of which, for clarity, only the respective locking element 38 is shown. Both locking elements are in their lower, engaged position, shown in FIG. 2. The work carrier 9 initially occupies a midposition, for example. If the carrier is now displaced in the direction of arrow 45 (FIG. 3) up to the position shown in FIG. 4, in which work holder 14 and work carrier 9 are associated with each other in the provided manner, the lefthand locking element 38 can thereupon be retracted upwardly, whereby, work holder 14 is disengaged. If work carrier 9 is then displaced in the opposite direction, thus, in the direction of arrow 46, it takes the fixedly clamped work holder 14 along.

Figure 5:
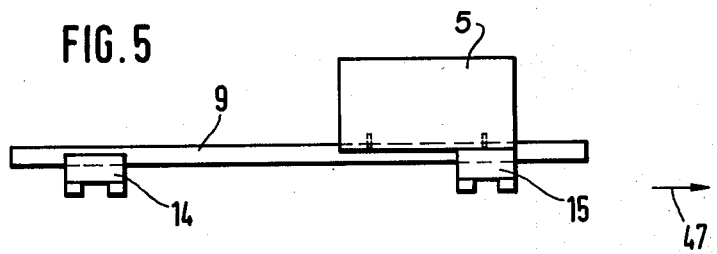
Figure 6:
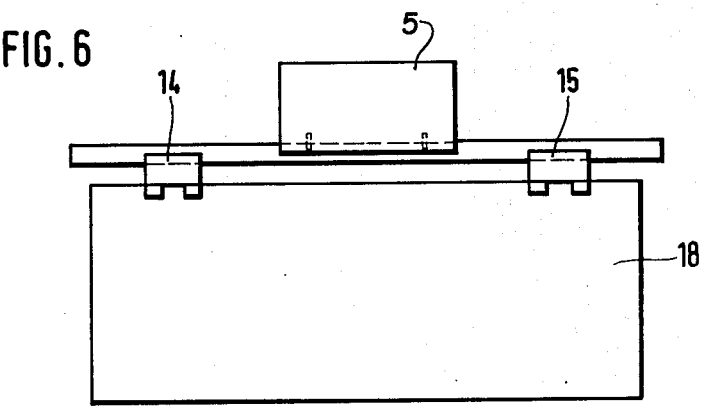

Upon reaching the position of displacement shown in FIG. 5, in which work holder 15 is also correctly positioned relative to work carrier 9, the righthand locking element 38 can also be retracted upwardly, whereby, work holder 15 becomes disengaged from carrier guide 5. After a repeated motion reversal, i.e., a displacement of work carrier 9 back in the direction of arrow 47, the work carrier finally attains its position shown in FIG. 6, in which the workpiece 18 is put in place. An analogous procedure is followed during a new setting or resetting of one or both of the work holders, i.e., first the respective work holder is brought below its locking element and is then engaged. For this purpose, the movable upper parts of holding element 16 and 17 can be moved into engagement in the direction of arrow 48 or lifted in the opposite direction.

In the embodiment shown, two locking devices 37 and two work holders 14 and 15 are provided. It will be easily understood, however, that more than two or also only one of each of such elements may be provided. It is further possible to provide a number of work holders which is different from that of the locking devices, for example, a single locking device and two work holders. If the displacement of the work holders is performed automatically, especially through a program control of the machine tool, and two or more locking devices are employed, their lateral spacing or the lateral spacing of the locking elements must be taken into account additionally.

While a specific embodiment of the invention has been shown and described in detail to illustrate the application of the principles of the invention, it will be understood that the invention may be embodied otherwise without departing from such principles.

What is claimed is:

1. A machine tool construction, comprising, a support frame having a bar portion, a carrier guide mounted on said bar portion for movement backwardly and forwardly therealong, a work carrier mounted on said carrier guide for backward and forward movement at right angles to said bar portion, at least one workpiece holder having means thereon for clamping a workpiece thereto and being mounted on said work carrier for movement backwardly and forwardly along said work carrier, a locking device overlying said work carrier and the path of movement of said workpiece holder including a locking element movable toward and away from said workpiece holder, said workpice holder having a top with a locking recess into which said locking element is enageable when said workpiece holder is precisely positioned with respect to said locking device.

2. A machine tool construction, as claimed in claim 1, including a fixing device carried by said workpiece holder comprising a member engageable with said work carrier to lock said workpiece holder to said carrier for movement therewith.

3. A machine tool construction, as claimed in claim 1, wherein said locking device comprises a locking element in the form of a hydraulic piston and including a cylinder in which said piston is movable.

4. A machine tool construction, as claimed in claim 1, including first drive means comprising a rack on said bar portion and a drive motor having a drive pinion engaged with said rack carried on said carrier guide for moving said carrier guide relative to said bar and a second drive means comprising a rack on said work carrier and a motor carried by said carrier guide having a second drive pinion engaged with said carrier guide rack to shift said work carrier relative to said carrier guide.

5. A machine tool construction, as claimed in claim 1, wherein said locking device comprises a member carried on at least one of said carrier guide and said frame and including a fluid pressure operated cylinder and piston, said piston comprising said locking element which is displaceable in said cylinder, said work holder comprising a recess in the top thereof which is alignable below said piston, said piston being engageable in said recess.

6. A machine tool construction, as claimed in claim 1, wherein said work carrier includes a bar portion of a trapezoidal section with a T-section connected centrally into the trapezoidal section, and including roller means engageable with the end portions of said trapezoidal section and, wherein, said T-section is engaged in said work holder and a hydraulic fixing device in said work holder engageable against said T-section to hold said work carrier relative to said work holder.

7. A machine tool construction, as claimed in claim 6, wherein said locking device comprises a fluid pressure operated piston and cylinder combination, said clamping means for clamping said workpiece to said workpiece holder and said locking device each comprising double-acting pistons.

8. A machine tool construction, as claimed in claim 1, wherein each of said bar portion and said work carrier include a gear rack defined along the length thereof and including a first drive motor carried by said carrier guide and having a first pinion engaged with the gear rack of said bar portion for moving said carrier guide relative to said bar portion and a second motor having a second drive pinion engaged with the rack of said work carrier for moving said carrier guide relative to said work carrier.

9. A machine tool construction, as claimed in claim 1, wherein said locking device is mounted on said carrier guide.

10. A machine tool construction, as claimed in claim 1, wherein there are a plurality of work holders movable along said work carrier, each of said holders having clamping means for clamping the workpiece.

11. A machine tool construction, as claimed in claim 10, including means connected to said locking device and means connected to said work holder to clamp the work holder to said carrier for selectively operating said locking device and said clamping means for clamping said work holder to said carrier.

12. A machine tool construction, as claimed in claim 1, wherein said work carrier comprises a bar member having a trapezoidal section and a T-section connecting the central part of the trapezoidal section, said work carrier including an opening slot therein through which said T-section extends, said work carrier having a bore therein carrying the enlarged portion of the T-section, clamping piston means in said work carrier for clamping said enlarged section of the T-section in position on said work carrier for locking said work carrier with said work holder, first roller means bearing against the sides of the trapezoidal section and second roller means bearing against the end of said trapezoidal section, both rotatably mounted in said work carrier, said locking device comprising a locking element in the form of a piston, means defining a fluid cylinder overlying said work carrier carrying said fluid piston and means for directing fluid into the cylinder for shifting said piston upwardly and downwardly relative to said work carrier.

* * * * *